(12) United States Patent
Park et al.

(10) Patent No.: US 8,265,178 B2
(45) Date of Patent: Sep. 11, 2012

(54) METHODS AND APPARATUS FOR SIGNAL AND TIMING DETECTION IN WIRELESS COMMUNICATION SYSTEMS

(75) Inventors: Ju Won Park, San Jose, CA (US); Jong Hyeon Park, San Jose, CA (US); Je Woo Kim, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 837 days.

(21) Appl. No.: 11/925,719

(22) Filed: Oct. 26, 2007

(65) Prior Publication Data

US 2008/0107220 A1 May 8, 2008

Related U.S. Application Data

(60) Provisional application No. 60/857,528, filed on Nov. 7, 2006.

(51) Int. Cl.
*H04L 7/02* (2006.01)

(52) U.S. Cl. ........ 375/260; 375/142; 375/150; 375/343; 370/208

(58) Field of Classification Search .................. 375/142, 375/150, 260, 343, 360; 370/203–211
See application file for complete search history.

(56) References Cited

U.S. PATENT DOCUMENTS

| | | | |
|---|---|---|---|
| 5,852,630 A | 12/1998 | Langberg et al. | |
| 6,707,856 B1 | 3/2004 | Gardner et al. | |
| 7,039,581 B1 | 5/2006 | Stachurski et al. | |
| 7,058,147 B2 | 6/2006 | Erving et al. | |
| 7,116,745 B2 | 10/2006 | Fanson et al. | |
| 7,203,245 B1 | 4/2007 | Murphy | |
| 7,236,554 B2 | 6/2007 | Gupta | |
| 7,251,282 B2 | 7/2007 | Maltsev et al. | |
| 7,502,311 B2 | 3/2009 | Song et al. | |
| 7,577,210 B2 | 8/2009 | Lee | |
| 7,813,442 B2 | 10/2010 | Gaikwad | |
| 8,045,636 B1 | 10/2011 | Lee et al. | |
| 8,107,561 B2 | 1/2012 | Huang et al. | |
| 2004/0246998 A1 | 12/2004 | Ma et al. | |
| 2006/0062196 A1 | 3/2006 | Cai et al. | |
| 2006/0071851 A1* | 4/2006 | Graas et al. | 342/357.14 |
| 2006/0078040 A1 | 4/2006 | Sung et al. | |

(Continued)

FOREIGN PATENT DOCUMENTS

EP 1424789 A1 6/2004

(Continued)

OTHER PUBLICATIONS

International Search Report, PCT/US07/083647, International Search Authority, European Patent Office, May 16, 2008.

(Continued)

*Primary Examiner* — Curtis Odom
(74) *Attorney, Agent, or Firm* — Charles Chesney

(57) ABSTRACT

In accordance with a detection method in a wireless communication system, an initial hypothesis for a starting position of a desired signal within a received wireless communication signal may be determined. The desired signal may have a conjugate symmetric property. At least one correlation value may be determined based on the initial hypothesis. The at least one correlation value may indicate the extent to which at least one sample sequence selected from the received signal has the conjugate symmetric property.

25 Claims, 13 Drawing Sheets

U.S. PATENT DOCUMENTS

| | | | |
|---|---|---|---|
| 2006/0239179 A1 | 10/2006 | Berkeman et al. | |
| 2006/0245349 A1 | 11/2006 | Vrcelj et al. | |
| 2007/0058693 A1* | 3/2007 | Aytur et al. | 375/130 |
| 2007/0280098 A1* | 12/2007 | Bhatt et al. | 370/208 |
| 2008/0107200 A1 | 5/2008 | Zhu et al. | |
| 2009/0154627 A1 | 6/2009 | Park et al. | |
| 2009/0175394 A1 | 7/2009 | Park et al. | |
| 2010/0128630 A1 | 5/2010 | Barak et al. | |

FOREIGN PATENT DOCUMENTS

| | | |
|---|---|---|
| EP | 1755299 A2 | 2/2007 |
| JP | 2008503186 A | 1/2008 |
| RU | 2149509 | 5/2000 |
| RU | 2157592 | 10/2000 |
| RU | 2168278 | 5/2001 |
| RU | 2221330 C2 | 1/2004 |
| RU | 2232469 C2 | 7/2004 |
| RU | 2295842 | 3/2007 |
| WO | WO9610873 | 4/1996 |
| WO | WO9635268 | 11/1996 |
| WO | WO9849857 A1 | 11/1998 |
| WO | WO02080600 A1 | 10/2002 |
| WO | WO2005101780 A1 | 10/2005 |
| WO | WO2006115368 A1 | 11/2006 |
| WO | WO2007138453 | 12/2007 |

OTHER PUBLICATIONS

Written Opinion, PCT/US07/083647, International Search Authority, European Patent Office, May 16, 2008.

Tejas et al., "Initial Synchronization for 802.16e Downlink," Signals, Systems, and Computers, Oct. 1, 2006, pp. 701-706, Fortieth Asiloma R. Conference on ACSSC '06, IEEE, PI, XP031081135.

Kang et al., "Robust OFDMA Frame Synchronization Algorithm on Inter-Cell Interference," 2006 Asia-Pacific Conference on Communications, Aug. 1, 2006, pp. 1-5, IEEE, PI, XP031002076.

Um et al., "A Robust Timing Synchronization Algorithm for OFDM Systems over Multipath Rayleigh Fading Channels," IEICE Transactions on Fundamentals of Electronics, Communications and Computer Sciences, Jun. 1, 2006, pp. 1705-1709, vol. E89-A, No. 6, Engineering Sciences Society, Tokyo, JP, XP001243110.

Jiho Jang et al., "A Common SYNC Symbol for FFT sizes other than 2048", Publication, Aug. 27, 2004 and Sep. 20, 2004, 8 pages, IEEE 802.16 Broadband Wireless Access Working Group.

Taiwan Search Report—TW096142169—TIPO—May 8, 2011.

IEEE, "Air Interface for Fixed Broadband Wireless Access Systems," Draft Standard, May 2004, 915 pages, P802.16-REVd/D5-2004, Part 16, New York, New York.

IEEE, "Corrigendum to IEEE Standard for Local and Metropolitan Area Networks—Part 16: Air Interface for Fixed Broadband Wireless Access Systems," Draft Standard, Sep. 12, 2005, 288 pages, P802.16-2004/Cor1/D5, New York, New York.

IEEE, "Part 16: Air Interface for Fixed Broadband Wireless Access Systems. Amendment for Physical and Medium Access Control Layers for Combined Fixed and Mobile Operation in Licensed Bands," Draft Standard, Oct. 14, 2005, 684 pages, P802.16e/D12, New.

Manusani, S. K. et al.: "Robust Time and Frequency Synchronization in OFDM based 802.11a WLAN Systems,"Annual India Conference, 2006, IEEE, PI, Sep. 1, 2006, pp. 1-4, XP031042626, ISBN: 978-1-4244-0369-1.

* cited by examiner

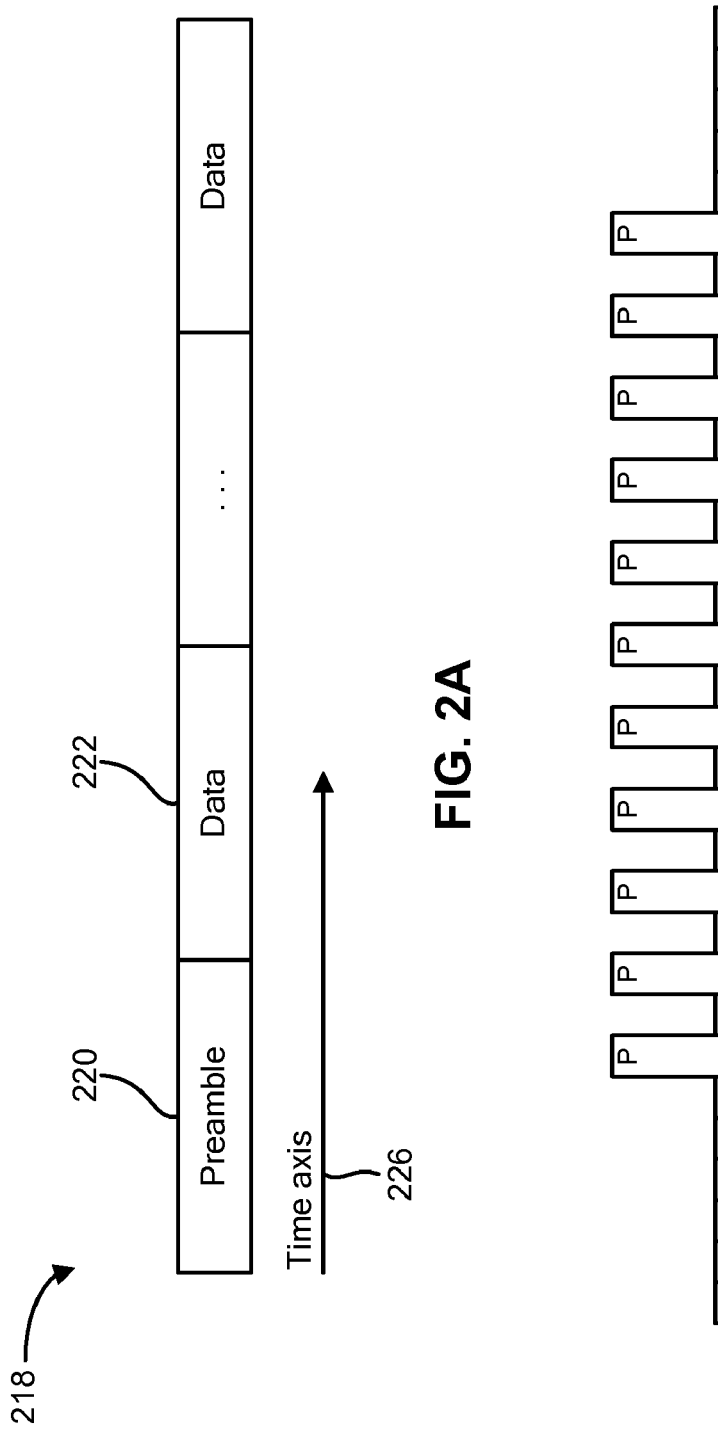
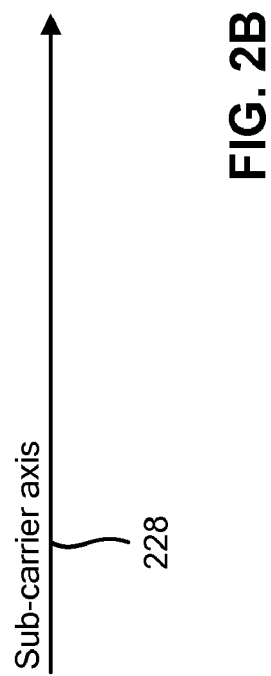
FIG. 2A
FIG. 2B

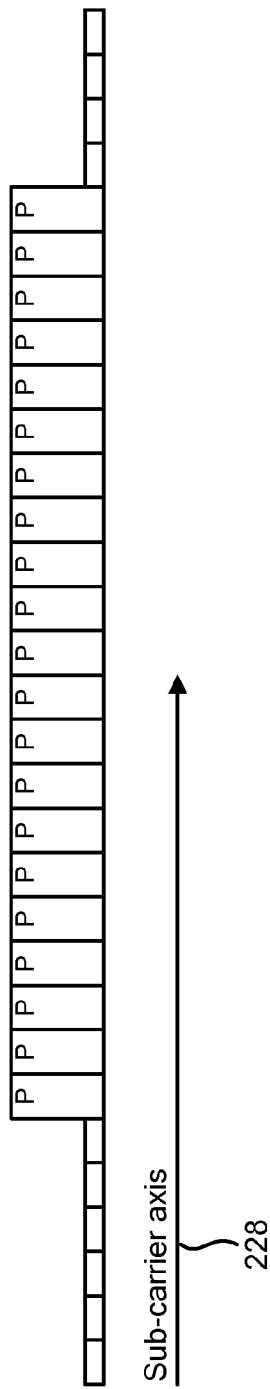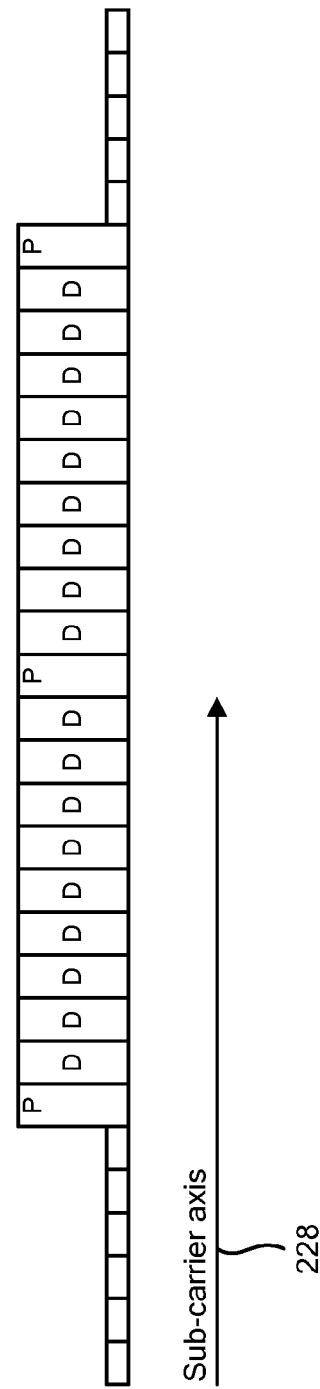

METHODS AND APPARATUS FOR SIGNAL AND TIMING DETECTION IN WIRELESS COMMUNICATION SYSTEMS

CLAIM OF PRIORITY

This application claims the benefit of priority from U.S. Provisional Patent Application No. 60/857,528, filed on Nov. 7, 2006 and entitled "Preamble Detection and Synchronization in OFDMA Wireless Communication Systems", which is owned by the assignee of this application and is fully incorporated herein by reference for all purposes.

TECHNICAL FIELD

The present disclosure relates generally to wireless communication systems. More specifically, the present disclosure relates to methods and apparatus for signal and timing detection in wireless communication systems.

BACKGROUND

Wireless communication systems are an important part of life in the 21st century. Wireless communication devices have become smaller and more powerful in order to meet consumer needs and to improve portability and convenience. Consumers have become dependent upon wireless communication devices such as cellular telephones, personal digital assistants (PDAs), laptop computers, and the like, demanding reliable service, expanded areas of coverage, and increased functionality.

A wireless communication system may simultaneously support communication for multiple wireless terminals or user devices. Each terminal may communicate with one or more access points via transmissions on the forward and reverse links. The forward link (or downlink) refers to the communication link from the access points to the terminals, and the reverse link (or uplink) refers to the communication link from the terminals to the access points.

Wireless communication systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems. Generally, access points assign various resources to individual terminals supported by the access point.

Signal detection and timing detection are important tasks for wireless communication systems. Without accurate signal and timing detection algorithms, it may be difficult to reliably receive data that is transmitted. As mentioned above, the present disclosure relates generally to methods and apparatus for signal and timing detection in wireless communication systems.

BRIEF DESCRIPTION OF THE DRAWINGS

FIGS. 2A-2D illustrate an example of a frame structure for an OFDM/OFDMA system;

SUMMARY

Figure 1:
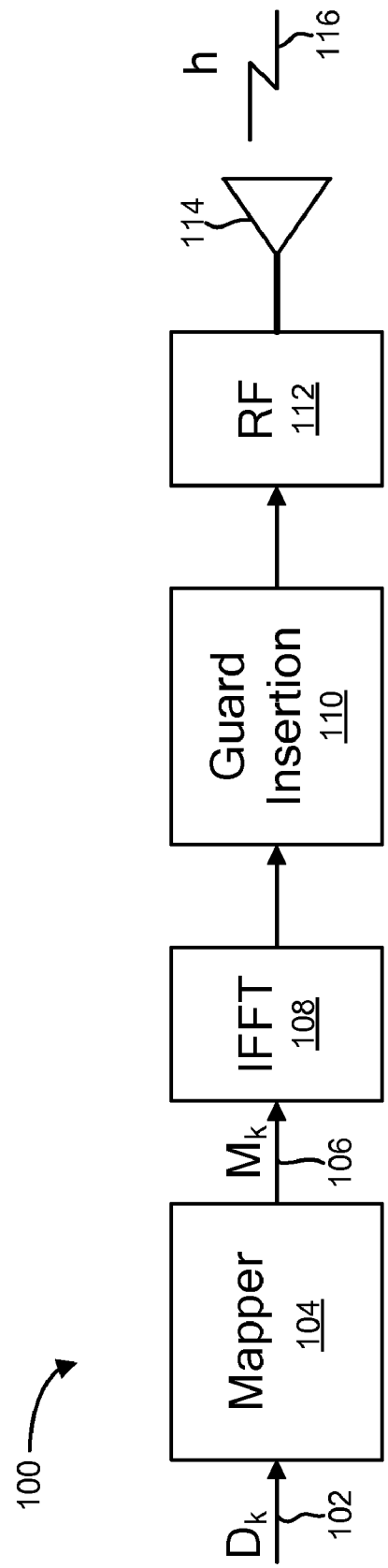
FIG. 1 illustrates an example of a transmitter for an OFDM/OFDMA system.

A detection method in a wireless device is disclosed. An initial hypothesis for a starting position of a desired signal within a received wireless communication signal may be determined. The desired signal may have a conjugate symmetric property. At least one correlation value may be determined based on the initial hypothesis. The correlation value(s) may indicate the extent to which at least one sample sequence selected from the received signal has the conjugate symmetric property.

A wireless device is also disclosed. The wireless device may include a coarse detector that is configured to determine an initial hypothesis for a starting position of a desired signal within a received signal. The desired signal may include a conjugate symmetric property. The wireless device may also include a correlator that is configured to determine at least one correlation value based on the initial hypothesis. The correlation value(s) may indicate the extent to which at least one sample sequence selected from the received signal has the conjugate symmetric property.

An apparatus is also disclosed. The apparatus may include means for determining an initial hypothesis for a starting position of a desired signal within a received signal. The desired signal may include a conjugate symmetric property. The apparatus may also include means for determining at least one correlation value based on the initial hypothesis. The correlation value(s) may indicate the extent to which at least one sample sequence selected from the received signal has the conjugate symmetric property.

A computer-program product for performing detection in a wireless communication device is also disclosed. The computer-program product may include a computer readable medium having instructions thereon. The instructions may include code for determining an initial hypothesis for a starting position of a desired signal within a received signal. The desired signal may include a conjugate symmetric property. The computer-program product may also include code for determining at least one correlation value based on the initial hypothesis. The correlation value(s) may indicate the extent to which at least one sample sequence selected from the received signal has the conjugate symmetric property.

DETAILED DESCRIPTION

As indicated above, the present disclosure relates generally to signal and timing detection methods in wireless communication systems. The methods and apparatus of the present disclosure may be utilized in a broadband wireless communication system. The term broadband wireless refers to technology that provides high-speed wireless, voice, Internet and data network access over a wide area.

WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint enabling broadband access to homes and businesses. Mobile WiMAX offers the full mobility of cellular networks at broadband speeds.

Mobile WiMAX is based on OFDM (orthogonal frequency division multiplexing) and OFDMA (orthogonal frequency division multiple access) technology. OFDM is a digital multi-carrier modulation technique that has recently found wide adoption in a variety of high-data-rate communication systems. With OFDM, a transmit bit stream is divided into multiple lower-rate sub-streams. Each sub-stream is modulated with one of a plurality of orthogonal sub-carriers and sent over one of a plurality of parallel sub-channels. OFDMA is a multiple access technique in which users are assigned sub-carriers in different time slots. OFDMA is a flexible multiple-access technique that can accommodate many users with widely varying applications, data rates, and quality of service requirements.

IEEE 802.16x is an emerging standard organization to define an air interface for fixed and mobile broadband wireless access (BWA) systems. IEEE 802.16x approved "IEEE P802.16-REVd/D5-2004" in May 2004 for fixed BWA systems and published "IEEE P802.16e/D12 Oct. 2005" in October 2005 for mobile BWA systems. Those two standards defined four different physical layers (PHYs) and one medium access control (MAC) layer. The OFDM and OFDMA PHY of the four PHYs are the most popular in the fixed and mobile BWA areas respectively.

Certain aspects of the present disclosure will be described in relation to broadband wireless communication systems based on OFDM/OFDMA technology. However, the scope of the present disclosure is not limited to such systems. The methods and apparatus disclosed herein may be utilized in other types of wireless communication systems.

FIG. 1 illustrates an example of a transmitter 100 for an OFDM/OFDMA system. In FIG. 1, transmission data $D_k$ 102 is shown being fed into a mapper component 104. The mapper component 104 may perform mapping and modulation, and may output a mapped/modulated signal $M_k$ 106. The mapped/modulated signal $M_k$ 106 is shown being fed through an inverse fast Fourier transform (IFFT) component 108, a guard insertion component 110, a radio frequency (RF) front end 112, and an antenna 114. The resulting signal is then shown being transmitted into a wireless channel h 116.

FIGS. 2A-2D illustrate an example of a frame structure for an OFDM/OFDMA system. Referring initially to FIG. 2A, an OFDM/OFDMA frame 218 is shown with respect to a time axis 226. The OFDM/OFDMA frame 218 is shown with one preamble symbol 220 and with multiple data symbols 222. Although just one preamble symbol 220 is shown in FIG. 2A, an OFDM/OFDMA frame 218 may include multiple preamble symbols 220.

FIGS. 2B and 2C illustrate examples of frequency domain representations of a preamble symbol 220. These frequency domain representations are shown with respect to a sub-carrier axis 228. In FIG. 2B, the preamble symbol 220 is shown with multiple equally spaced pilot sub-carriers. In FIG. 2C, all of the used sub-carriers are pilot sub-carriers.

FIG. 2D illustrates an example of a frequency domain representation of a data symbol 222, which is also shown with respect to the sub-carrier axis 228. The data symbol 222 includes both data sub-carriers and pilot sub-carriers. A receiver may perform channel estimation using pilot sub-carriers of a preamble symbol 220 and/or pilot sub-carriers of a data symbol 222.

In an IEEE802.16e OFDM/OFDMA system, there are three types of preamble carrier sets. The carrier sets are defined by allocation of different sub-carriers for each one of them. The sub-carriers are modulated using a boosted BPSK modulation with a specific Pseudo-Noise (PN) code.

The preamble carrier sets may be defined using the following formula:

$$PA_{cset}=s+3z \quad (1)$$

In equation (1), the term $PA_{cset}$ represents all sub-carriers allocated to the specific preamble based on the useful sub-carrier index. The term s represents the number of the preamble carrier set indexed 0 . . . 2 which corresponds to the segment of the sector. The term z represents a running index starting from 0 to M−1, where M is the length of the PN code. For example, M=284 at N=1024 FFT mode.

Each segment uses a preamble corresponding to a carrier set out of the three available carrier sets in the following manner: segment 0 uses preamble carrier set 0, segment 1 uses preamble carrier set 1, and segment 2 uses preamble carrier set 2. (In the case of segment 0, the DC carrier is not modulated at all and the appropriate PN is discarded. Therefore, the DC carrier is zeroed. For the preamble symbol there are 86 guard band sub-carriers on the left side and the right side of the spectrum.) For a 1024 FFT size the PN series modulating the preamble carrier set is defined in the standard specification for an IEEE802.16e OFDM/OFDMA system.

Figure 3:
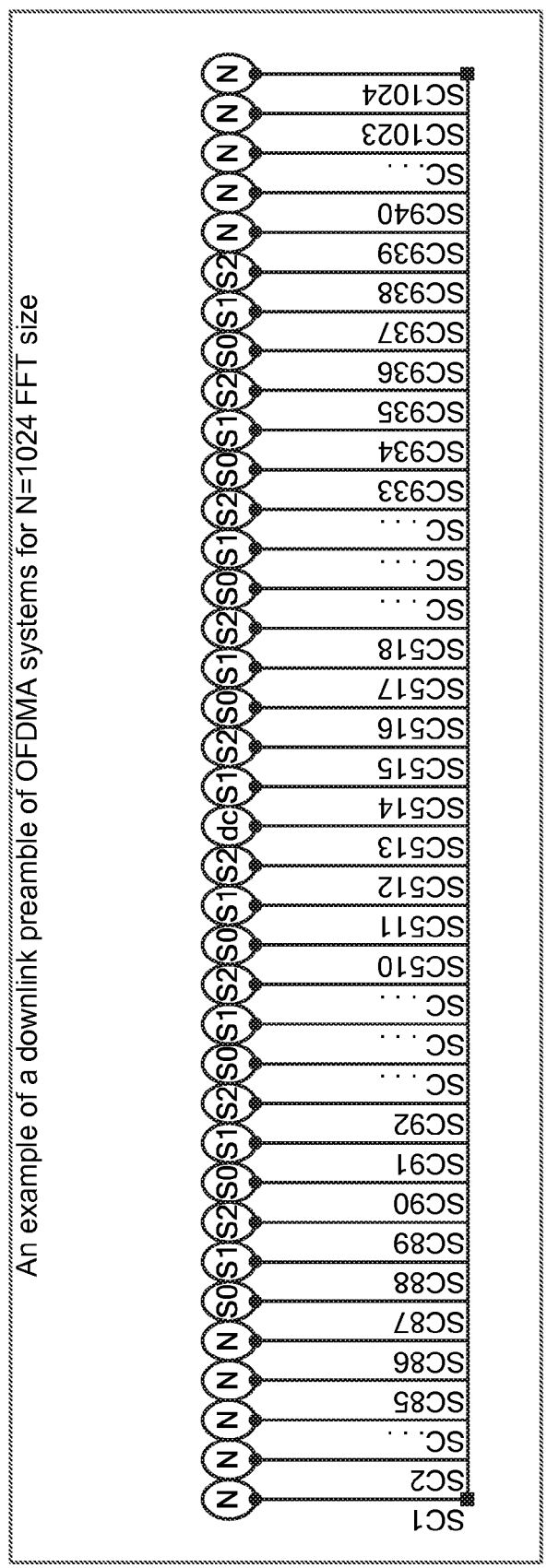
FIG. 3 illustrates an example of a frequency domain downlink preamble structure of an OFDM/OFDMA system.

FIG. 3 shows a frequency domain downlink preamble structure for an IEEE802.16e OFDM/OFDMA system with N=1024 FFT size. In FIG. 3, N stands for a null sub-carrier, S0 stands for a sub-carrier which belongs to segment 0, S1 stands for a sub-carrier which belongs to segment 1, S2 stands for a sub-carrier which belongs to segment 2, and dc stands for a DC sub-carrier. Assuming N=1024 FFT size, there are 1024 sub-carriers, and these sub-carriers are numbered from SC1 to SC1024.

Figure 4:
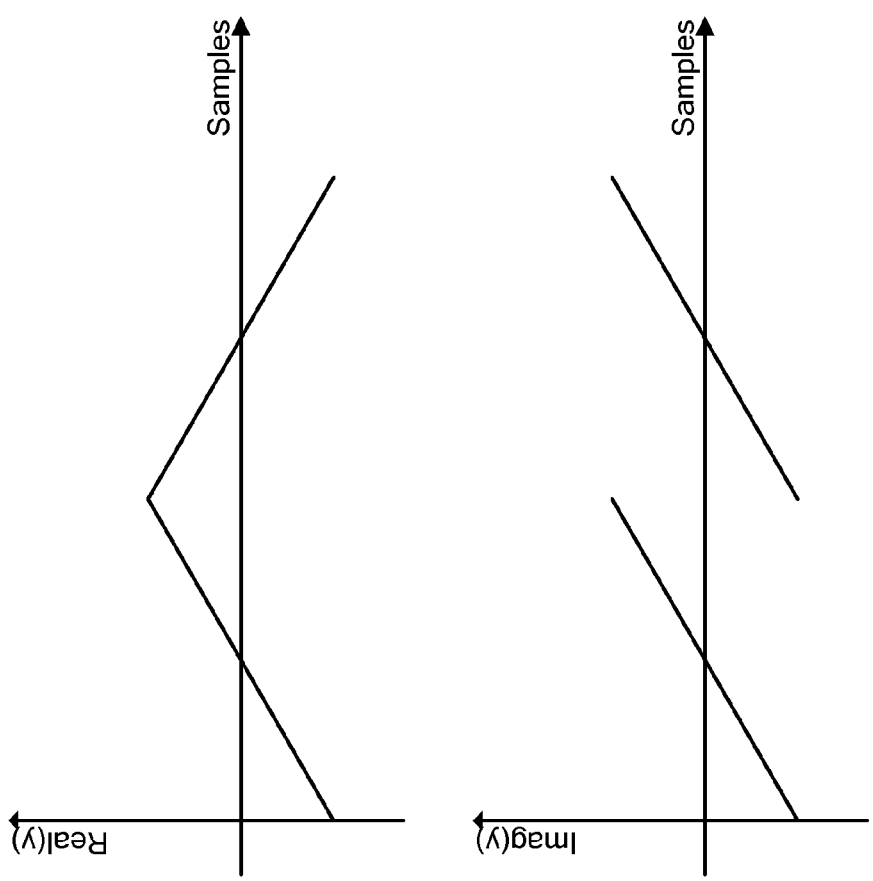
FIG. 4 illustrates an example of a signal having a conjugate symmetric property.

The present disclosure relates generally to signals that have the conjugate symmetric property in the time domain. FIG. 4 illustrates an example of a signal that has the conjugate symmetric property in the time domain. A signal, y(n), that has the conjugate symmetric property in the time domain may be written as:

$$y(n)=y^*(N-n+1), n=1,2,\ldots,N \quad (2)$$

The preamble signal for an IEEE802.16e OFDM/OFDMA system is an example of a signal that has the conjugate symmetric property. In the discussion that follows, various methods and apparatus will be described in relation to the preamble signal for an IEEE802.16e OFDM/OFDMA system. However, the scope of the present disclosure is not limited to OFDM/OFDMA systems. The methods and apparatus disclosed herein may be applied to other signals that have the conjugate symmetric property.

Let us assume that N samples of an OFDM/OFDMA preamble signal in the time domain are received as follows:

$$p(n)=[p(1),p(2),\ldots,p(N)] \quad (3)$$

It may be observed that the sample p(1) and the sample $$p\left(\frac{N+1}{2}\right)$$

do not have any conjugate symmetric pairs. Thus, a signal y(n) may be created in accordance with equation (4). Then, the values of y(1) and $$y\left(\frac{N}{2}+1\right)$$

and may be nullified in accordance with equations (5) and (6). This may be done for the purpose of ensuring that the OFDM/OFDMA preamble signal fully has the conjugate symmetric property.

$$y(n) = p(n) \text{ for } n = 1, 2, \ldots, N \quad (4)$$

$$y(1) = 0 \quad (5)$$

$$y\left(\frac{N}{2}+1\right) = 0 \quad (6)$$

For a signal having the conjugate symmetric property in the time domain, such as the OFDM/OFDMA preamble signal, it may be possible to perform signal detection, preamble detection, and/or symbol and frame timing detection using equation (7):

$$r_{cs}(n_0) = \sum_{n=1}^{L} y(n_0 + n)y(n_0 + N - n + 1) \quad (7)$$

Figure 5:
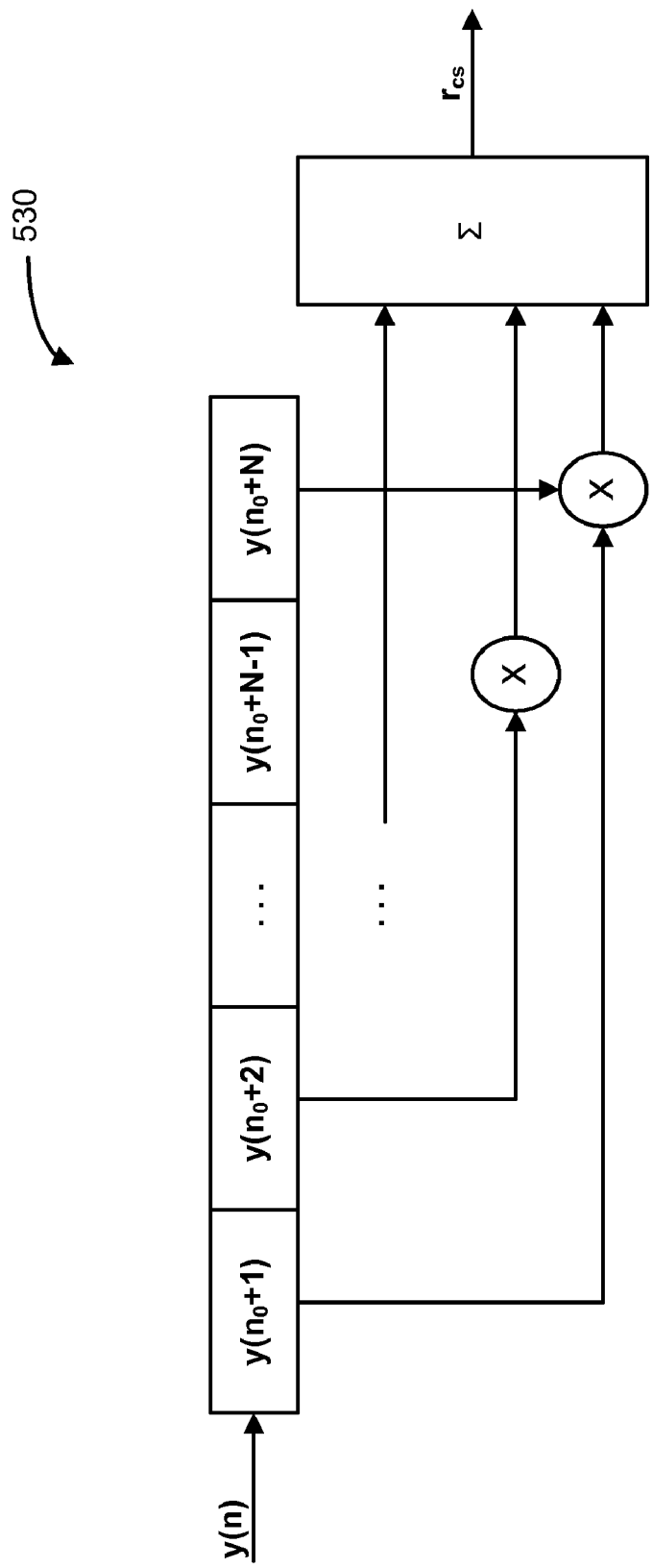
FIG. 5 illustrates a time domain conjugate symmetric based correlator.

In equation (7), the term $n_0$ represents a hypothesis for the starting position of the desired signal (e.g., the OFDM/OFDMA preamble signal) within a received signal y( ). The term N represents the number of samples of the received signal y( ) that are under consideration. The correlation value $r_{cs}(\ )$ is a measure of the extent to which the sample sequence corresponding to $y(n_0+1:n_0+N)$ has the conjugate symmetric property. The term L represents the size of correlation. The value of L may be chosen so that $L \leq N/2$. FIG. 5 illustrates a time domain conjugate symmetry based correlator 530 corresponding to equation (7).

Assuming that $n_0$ represents the timing hypothesis, and also assuming that there is a range to be searched, then equation (7) may be modified as follows:

$$r_{cs}(n_0 + w) = \sum_{n=1}^{L} y(n_0 + w + n)y(n_0 + w + N - n + 1) \quad (8)$$

In equation (8), the range of w may be represented as $-N_w \leq w \leq N_w$. The term $N_w$ corresponds to the size of the search window. The correlator represented by equation (8) may be referred to as a time domain conjugate symmetry based correlator with a search window size $N_w$.

After the above conjugate symmetric correlation is performed for a number of adjacent sequences, the correlation values may be used for detecting a desired signal. For example, in an OFDM/OFDMA system, the correlation values may be used for detecting an OFDM/OFDMA preamble signal. The largest correlation output may be selected and compared to a preset threshold. If the value of the largest correlation output is greater than the threshold, the current symbol may be considered as the incoming signal and the preamble, and symbol timing may also be detected from the values $n_0$ and w. The values $n_0$ and w may be considered to be the starting position of the useful symbol of the received preamble.

Equation (8) may be regarded as the correlation of two sequences. Assuming that the search window size $N_w$ is much less than the correlation window size L, i.e, $N_w \ll L$, equation (8) may be approximated as:

$$r_{cs}(n_0 + w) \approx \sum_{n=1}^{L} y(n_0 + n)y((n_0 + N + 1) - L + \langle w + L - n \rangle_L) \quad (9)$$

In equation (9), $\langle \rangle_L$ denotes modulo L. From equation (9), it may be seen that the first sequence is fixed for different values of w, while the second sequence is circular shifted based on the value of w. So equation (9) may be considered to be the circular convolution of two sequences. The correlator represented by equation (9) may be referred to as a time domain conjugate symmetry based correlator with a search window $N_w$ using circular convolution.

Without loss of generality in equation (9), it may be assumed that $n_0$ is zero for simplicity. The sequences may be written as:

$$S1 = [y(1)y(2) \ldots y(L)] \quad (10)$$

$$S2 = [y(N)y(N-1) \ldots y(N-L+1)] \quad (11)$$

Note that the sequence S2 is arranged in reversed order in time. Then a set of L correlation values may be obtained from the circular convolution as:

$$R_{cs} = [r_{cs}(1), r_{cs}(2), \ldots, r_{cs}(L)] \quad (12)$$

The timing reference is the initial hypothesis $n_0$ in the above $R_{cs}$. The set of correlation values $R_{cs}$ indicates the extent to which different sample sequences from the received signal have the conjugate symmetric property.

Similar results may be obtained using frequency domain processing instead of the above time domain processing. Because circular convolution in the time domain may be considered as frequency domain dot production, the resulting correlation may be expressed as:

$$R_{cs} \approx S1 \otimes S2 = IFFT(FFT(S1) \bullet (FFT(S2^*))^*) \quad (13)$$

In equation (13), $\otimes$ denotes circular convolution, • denotes tone-by-tone dot product, and ( )* denotes complex conjugate. The correlator represented by equation (13) may be referred to as a frequency domain conjugate symmetry based correlator.

Figure 6:
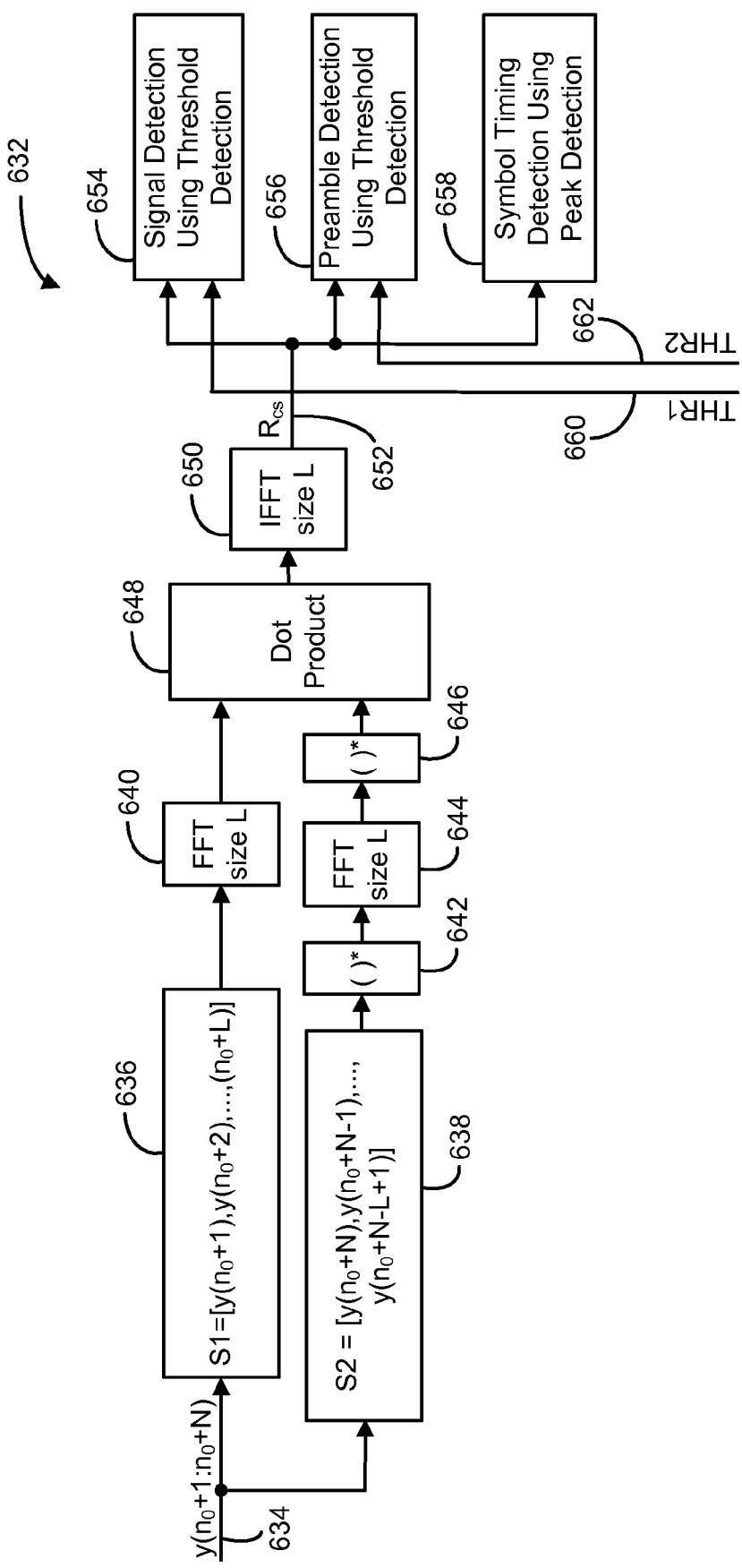
FIG. 6 illustrates a frequency domain conjugate symmetric based correlator.

FIG. 6 illustrates a frequency domain conjugate symmetry based correlator 632. FIG. 6 shows a sequence of samples of a received signal $y(n_0+1:n_0+N)$ 634. FIG. 6 also shows two sequences $S1=[y(n_0+1)y(n_0+2) \ldots y(n_0+L)]$ 636 and $S2=[y(n_0+N)y(n_0+N-1) \ldots y(n_0+N-L+1)]$ 638 being selected from the sequence $y(n_0+1:n_0+N)$ 634.

The first sequence S1 636 is shown being processed by a fast Fourier transform (FFT) component 640 of size L. The second sequence S2 638 is shown being processed by a complex conjugate component 642, an FFT component 644 of size L, and another complex conjugate component 646. The output of the FFT component 640 and the output of the complex conjugate component 646 are shown being provided to a dot product component 648. The output of the dot product component 648 is shown being provided to an inverse FFT (IFFT) component 650 of size L. The set of correlation values $R_{cs}$ 652 is shown as the output of the IFFT component 650.

The set of correlation values $R_{cs}$ 652 is shown being provided to a signal detection component 654, a preamble detection component 656, and a symbol timing detection component 658. A threshold THR1 660 is shown being provided to the signal detection component 654. The signal detection component 654 may perform signal detection by comparing the correlation values $R_{cs}$ 652 with the threshold THR1 660. A threshold THR2 662 is shown being provided to the preamble detection component 656. The preamble detection component 656 may perform preamble detection by comparing the correlation values $R_{cs}$ 652 with the threshold THR2 662. The thresholds THR1 660 and THR2 662 may be created by determining the power of the signal 634 that is used in the correlation calculation, and/or by determining the power of a noise signal.

Although this is not specifically shown in FIG. 6, to reduce searching time, the initial timing hypothesis $n_0$ may be determined using a coarse detection method. The coarse detection method may be based on a property of the OFDM/OFDMA preamble other than conjugate symmetry, e.g., the cyclic prefix property of the OFDM/OFDMA preamble, the repetition property of the OFDM/OFDMA preamble, etc.

Figure 7:
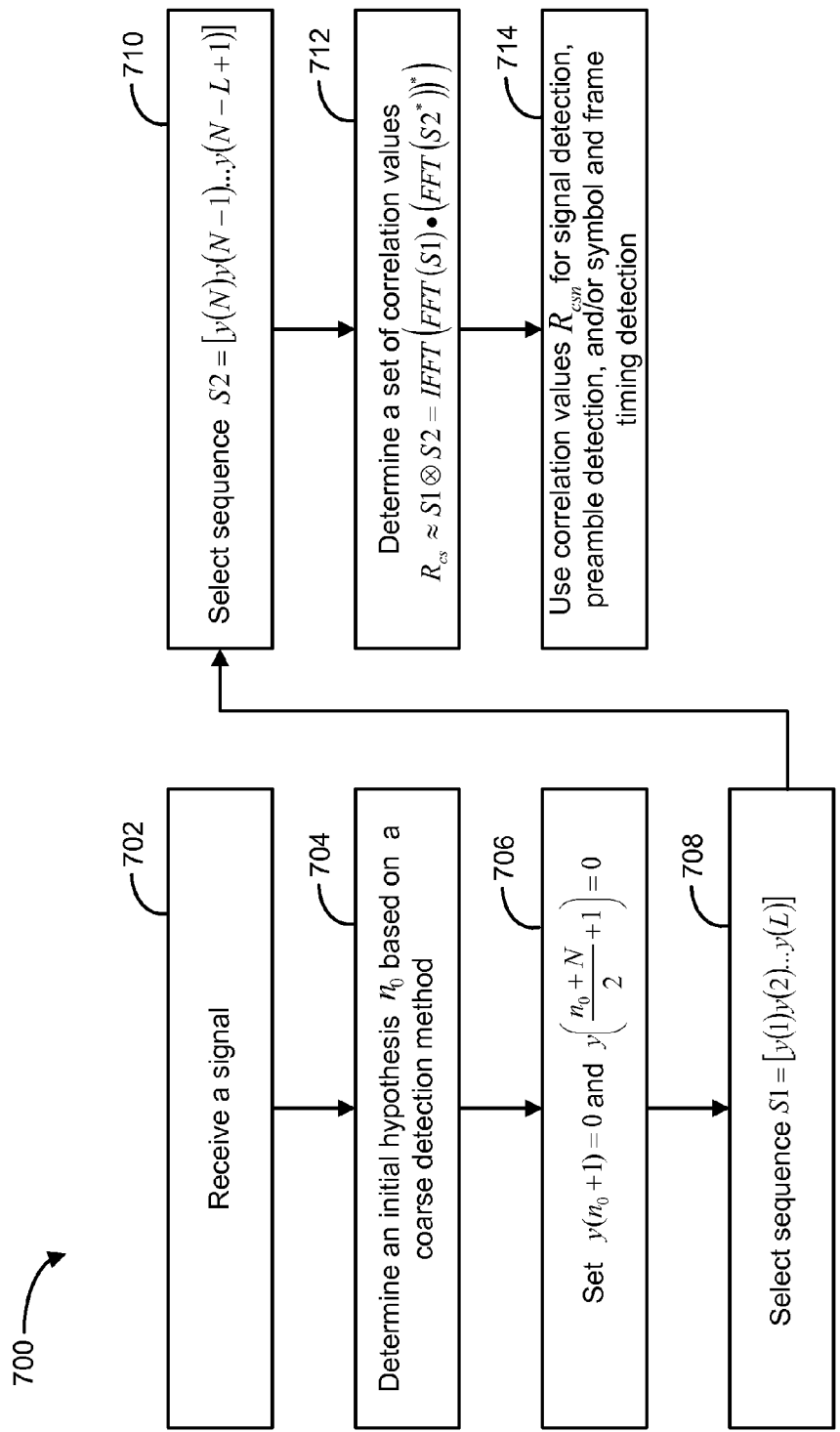
FIG. 7 illustrates a detection method that may be implemented by the frequency domain conjugate symmetric based correlator of FIG. 6.

FIG. 7 illustrates a detection method 700 in an OFDM/OFDMA system. The detection method 700 may be implemented by the frequency domain conjugate symmetry based correlator 632 that is shown in FIG. 6.

In accordance with the method 700, a signal 634 may be received 702. Initially, a hypothesis $n_0$ for the starting position of an OFDM/OFDMA preamble within the received signal 634 may be determined 704 based on a coarse detection method. As indicated above, the coarse detection method may be based on a property of the OFDM/OFDMA preamble other than conjugate symmetry, e.g., the cyclic prefix property of the OFDM/OFDMA preamble, the repetition property of the OFDM/OFDMA preamble, etc.

The samples $y(n_0+1)$ and $$y\left(\frac{n_0+N}{2}+1\right)$$

may be nullified 706 e.g., set equal to zero. Then, two sequences of samples S1 636 and S2 638 may be selected 708, 710 from the sequence $y(n_0+1:n_0+N)$ 634. The sequence S1 636 may be selected 708 as given by equation (10) above, and the sequence S2 638 may be selected 710 as given by equation (11) above (assuming that $n_0$ is zero). The sequences S1 636 and S2 638 may be processed in accordance with equation (13) above in order to determine 712 a set of correlation values $R_{csn}$. The correlation values $R_{csn}$ may be used 714 for signal detection, preamble detection, and/or symbol and frame timing detection.

Figure 8:
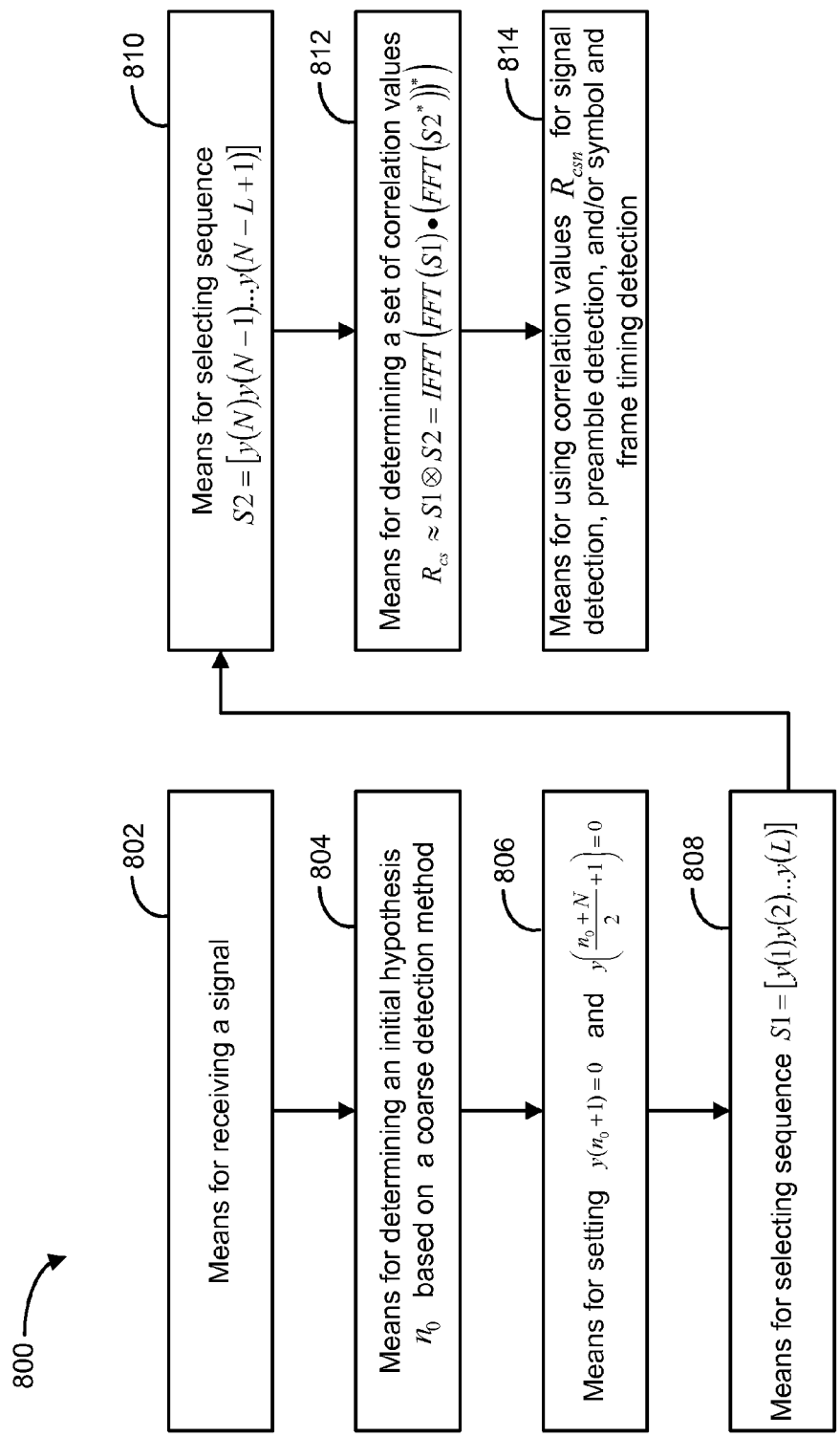
FIG. 8 illustrates means-plus-function blocks corresponding to the method shown in FIG. 7.

The method of FIG. 7 described above may be performed by various hardware and/or software component(s) and/or module(s) corresponding to the means-plus-function blocks illustrated in FIG. 8. In other words, blocks 702 through 714 illustrated in FIG. 7 correspond to means-plus-function blocks 802 through 814 illustrated in FIG. 8.

Instead of the sequences S1 and S2 that are defined in equations (10) and (11) above, two sequences $S1_n$ and $S2_n$ may be defined as:

$$S1_n = [y(1)y(2) \ldots y(L)] \quad (14)$$

$$S2_n = [y(N-L+1)y(N-L+2) \ldots y(N)] \quad (15)$$

The sequence $S2_n$ is arranged in regular order in time. In contrast, the sequence S2 was arranged in reversed order in time (see equation (11) above). It may be observed that the relationship between $S1_n$ and $S2_n$ has the following property:

$$S2_n(l) = S1_n^*(L-l+1) \text{ for } l=1,2,\ldots,L \quad (16)$$

Because of this property, the same L correlation values that were obtained using equation (13) above may be obtained using the following equation:

$$R_{csn} \approx S1 \otimes S2 = IFFT(FFT(S1_n) \bullet FFT(S2_n)) \quad (17)$$

As before, $\otimes$ denotes circular convolution, and • denotes tone-by-tone dot product. The correlator represented by equation (17) may be referred to as a modified frequency domain conjugate symmetry based correlator.

Figure 9:
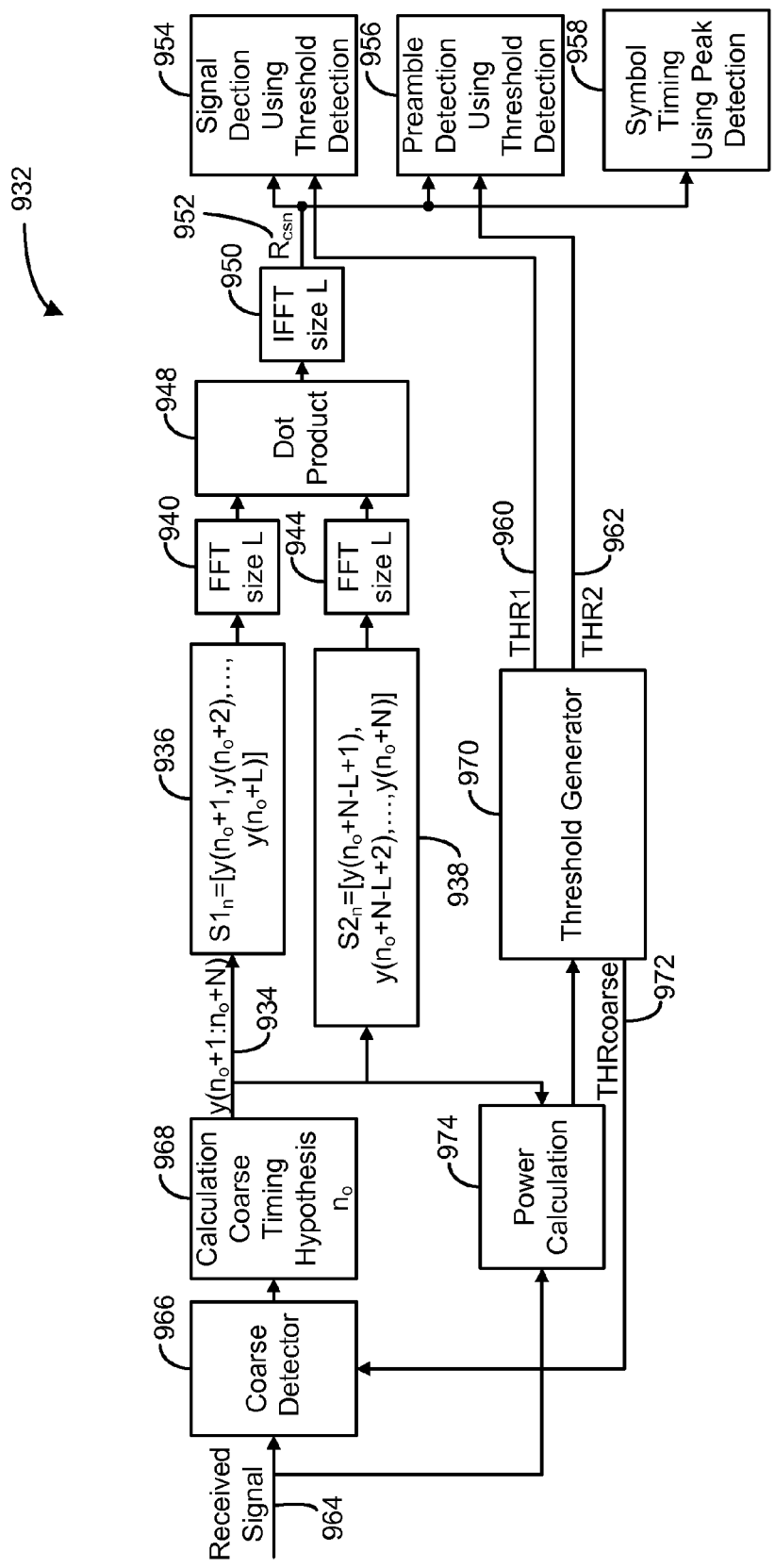
FIG. 9 illustrates a modified frequency domain conjugate symmetric based correlator.

FIG. 9 illustrates a modified frequency domain conjugate symmetry based correlator 932. A received signal 964 is shown being provided to a coarse detector 966 and a coarse timing hypothesis calculation component 968. These components 966, 968 may determine the initial timing hypothesis $n_0$ using a coarse detection method that is based on a property of the OFDM/OFDMA preamble other than conjugate symmetry, e.g., the cyclic prefix property of the OFDM/OFDMA preamble, the repetition property of the OFDM/OFDMA preamble, etc.

FIG. 9 shows a sequence of samples of a received signal $y(n_0+1:n_0+N)$ 934 being output from the coarse timing hypothesis calculation component 968. FIG. 9 also shows two sequences $S1_n = [y(n_0+1)y(n_0+2) \ldots y(n_0+L)]$ 936 and $S2_n = [y(n_0+N-L+1)y(n_0+N-L+2) \ldots y(n_0+N)]$ 938 being selected from the sequence $y(n_0+1:n_0+N)$ 934.

The first sequence $S1_n$ 936 is shown being processed by an FFT component 940 of size L. The second sequence $S2_n$ 938 is also shown being processed by an FFT component 944 of size L. The outputs of the FFT components 940, 944 are shown being provided to a dot product component 948. The output of the dot product component 948 is shown being provided to an IFFT component 950 of size L. The set of correlation values $R_{cs}$ 952 is shown as the output of the IFFT component 950. The set of correlation values $R_{cs}$ 952 is shown being provided to a signal detection component 954, a preamble detection component 956, and a symbol timing detection component 958.

FIG. 9 also shows a threshold generator 970. The threshold generator 970 is shown providing a threshold THR1 960 to the signal detection component 954, a threshold THR2 962 to the preamble detection component 956, and a threshold THR-coarse 972 to the coarse detector component 966.

FIG. 9 also shows a power calculation component 974. The received signal 964 is shown being provided as input to the power calculation component 974. The output of the power calculation component 974 is shown being provided to the threshold generator 970. The power calculation component 974 may calculate the power of the corresponding signals that are used in the correlation calculation and/or the power of a noise signal to generate the thresholds 960, 962, 972 that may be used in the detectors 954, 956, 966.

Figure 10:
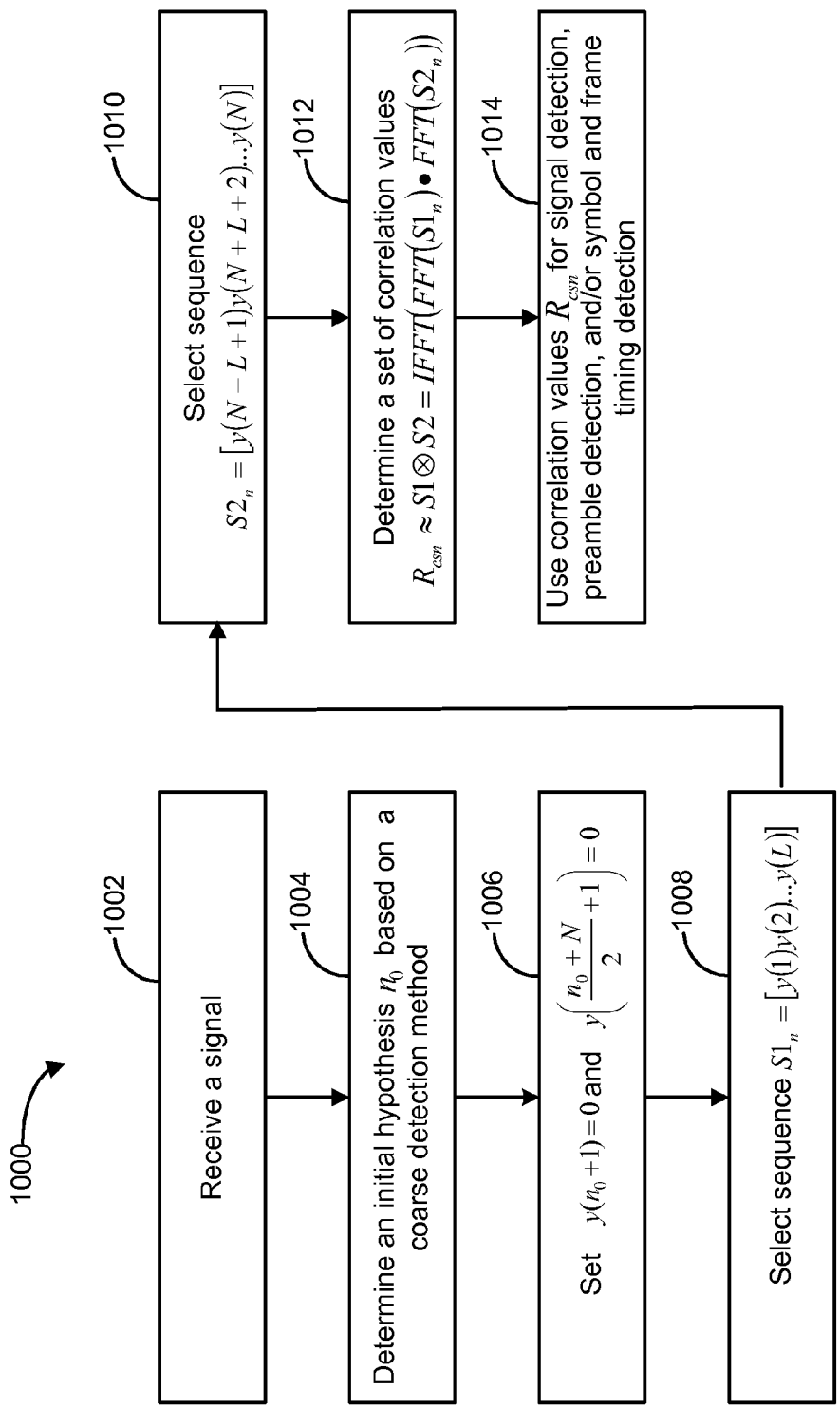
FIG. 10 illustrates a detection method that may be implemented by the modified frequency domain conjugate symmetric based correlator of FIG. 9.

FIG. 10 illustrates another detection method 1000 in an OFDM/OFDMA system. The detection method 1000 may be implemented by the modified frequency domain conjugate symmetry based correlator 932 that is shown in FIG. 9.

The first part of the method 1000 is similar to the first part of the method 700 shown in FIG. 7. In particular, when a signal 964 is received 1002, a hypothesis $n_0$ for the starting position of an OFDM/OFDMA preamble within the received signal 964 may be determined 1004 based on a coarse detection method. Also, the samples $y(n_0+1)$ and $$y\left(\frac{n_0 + N}{2} + 1\right)$$

may be set 1006 equal to zero.

Two sequences of samples $S1_n$ 936 and $S2_n$ 938 may be selected 1008, 1010 from the sequence $y(n_0+1:n_0+N)$ 934. In particular, the sequence $S1_n$ 936 may be selected 1008 as given by equation (14) above, and the sequence $S2_n$ 938 may be selected 1010 as given by equation (15) above (assuming that $n_0$ is zero). The sequences $S1_n$ 936 and $S2_n$ 938 may then be processed in accordance with equation (17) above in order to determine 1012 a set of correlation values $R_{csn}$. The correlation values $R_{csn}$ may be used 1014 for signal detection, preamble detection, and/or symbol and frame timing detection.

Figure 11:
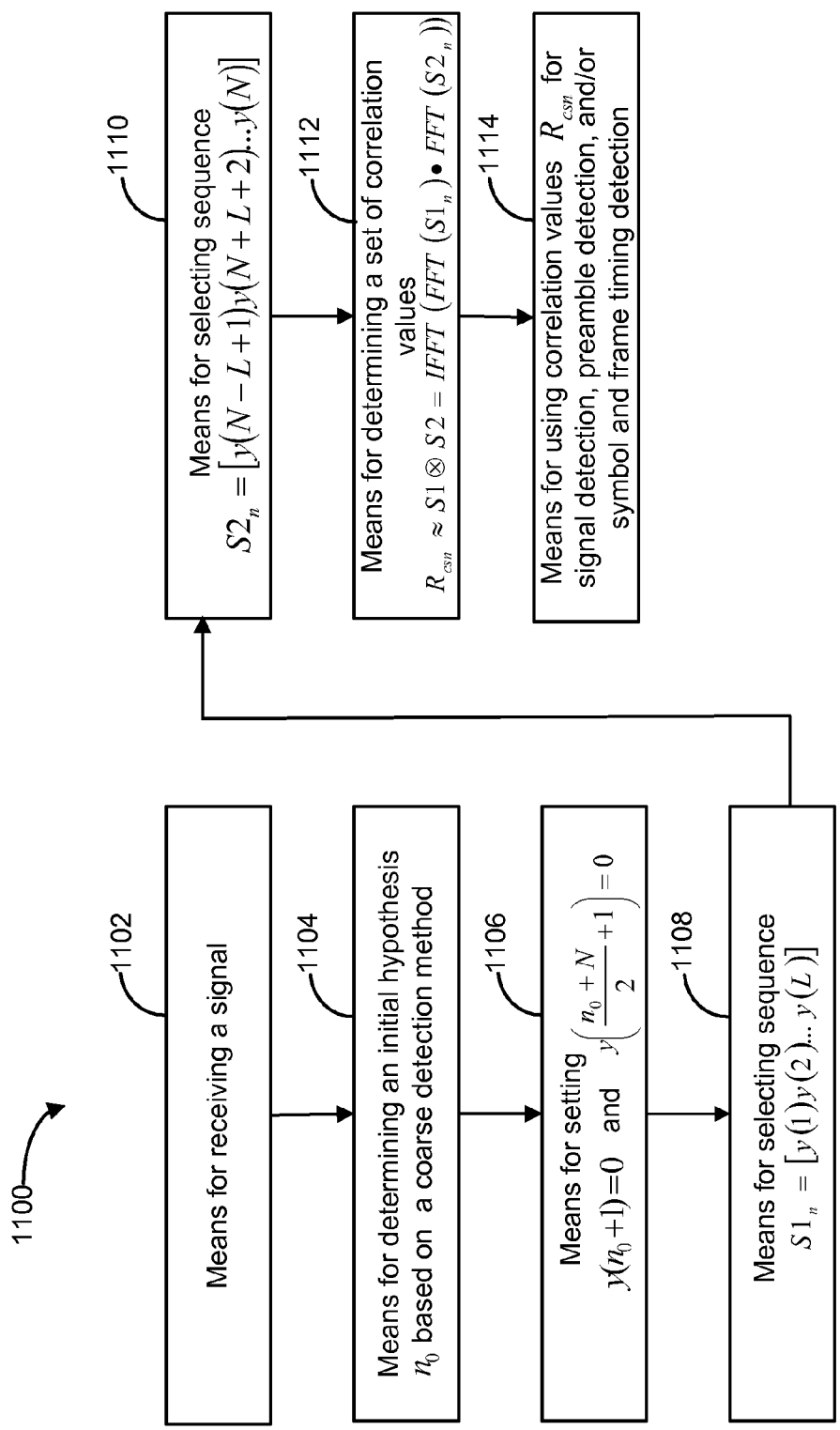
FIG. 11 illustrates means-plus-function blocks corresponding to the method shown in FIG. 10.

The method of FIG. 10 described above may be performed by various hardware and/or software component(s) and/or module(s) corresponding to the means-plus-function blocks illustrated in FIG. 11. In other words, blocks 1002 through 1014 illustrated in FIG. 10 correspond to means-plus-function blocks 1102 through 1114 illustrated in FIG. 11.

Figure 12:
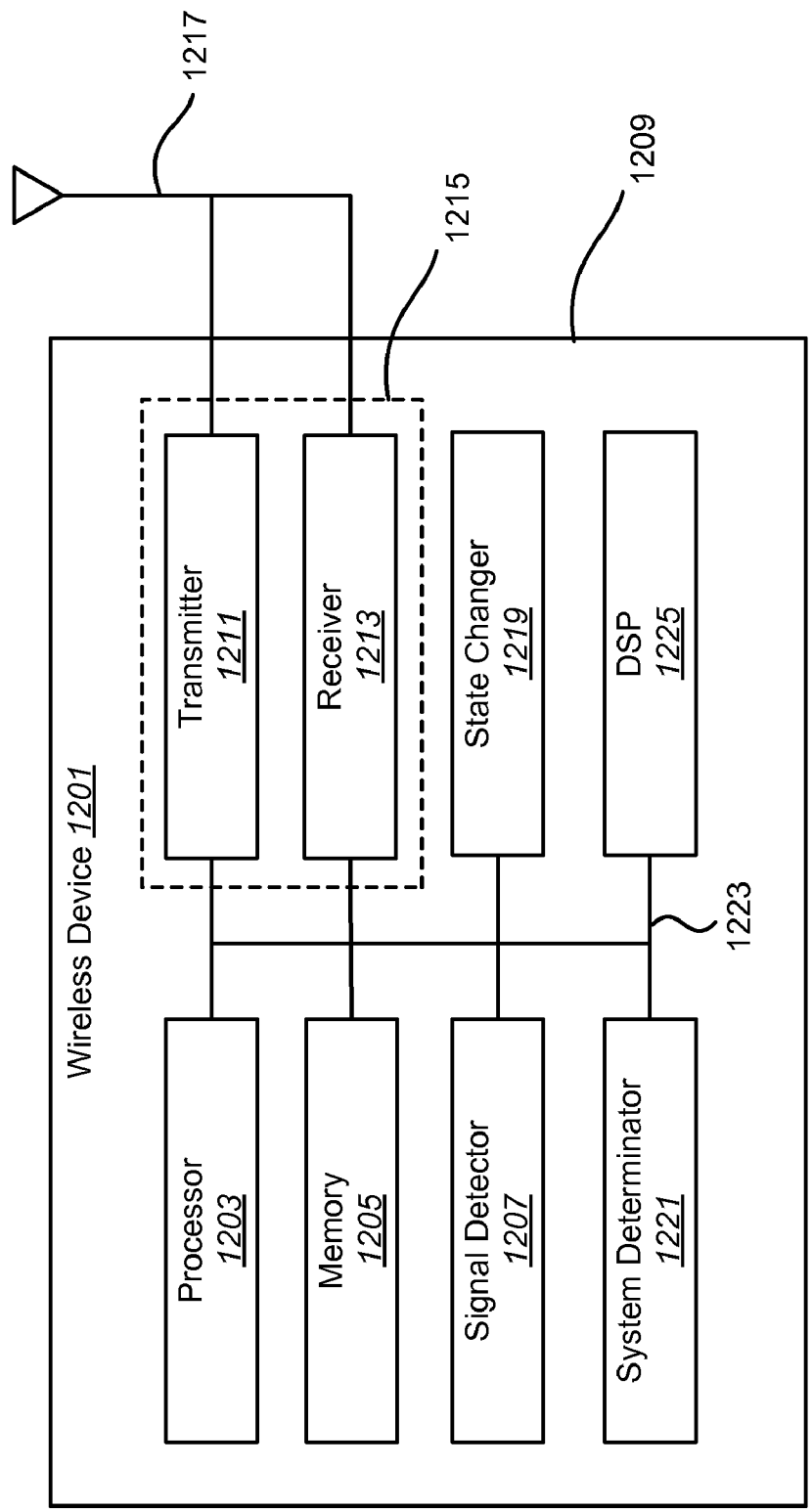
FIG. 12 illustrates various components that may be utilized in a wireless device.

FIG. 12 illustrates various components that may be utilized in a wireless device 1201. The wireless device 1201 is an example of an apparatus that may be configured to implement the various methods described herein. The wireless device 1201 may be a handset (e.g., an access terminal). Alternatively, the wireless device 1201 may be a base station (e.g., an access point, access network).

The wireless device 1201 may include a processor 1203 which controls operation of the device 1201. The processor 1203 may also be referred to as a central processing unit (CPU). Memory 1205, which may include both read-only memory (ROM) and random access memory (RAM), provides instructions and data to the processor 1203. A portion of the memory 1205 may also include non-volatile random access memory (NVRAM). The processor 1203 typically performs logical and arithmetic operations based on program instructions stored within the memory 1205. The instructions in the memory 1205 may be executable to implement the methods described herein. The wireless device 1201 may also include (not shown) multiple transmitters, multiple receivers, multiple transceivers and/or multiple antenna.

The wireless device 1201 may also include a housing 1209 that may include a transmitter 1211 and a receiver 1213 to allow transmission and reception of data between the wireless device 1201 and a remote location. The transmitter 1211 and receiver 1213 may be combined into a transceiver 1215. An antenna 1217 may be attached to the housing 1209 and electrically coupled to the transceiver 1215.

The wireless device 1201 may also include a signal detector 1207 that may be used to detect and quantify the level of signals received by the transceiver 1215. The signal detector 1207 may detect such signals as total energy, pilot energy per pseudonoise (PN) chips, power spectral density, and other signals.

A state changer 1219 of the wireless device 1201 may control the state of the wireless device 1201 based on a current state and additional signals received by the transceiver 1215 and detected by the signal detector 1207. The device 1201 may be capable of operating in any one of a number of states. The wireless device 1201 may also include a system determinator 1221 that may be used to control the device 1201 and to determine which service provider system the device 1201 should transfer to when it determines the current service provider system is inadequate.

The various components of the wireless device 1201 may be coupled together by a bus system 1223 which may include a power bus, a control signal bus, and a status signal bus in addition to a data bus. However, for the sake of clarity, the various busses are illustrated in FIG. 12 as the bus system 1223. The wireless device 1201 may also include a digital signal processor (DSP) 1225 for use in processing signals.

As used herein, the term "determining" (and grammatical variants thereof) is used in an extremely broad sense. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. Combinations of the above should also be included within the scope of computer-readable media.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A detection method in a wireless device, comprising:
    determining an initial hypothesis for a starting position of a desired signal within a received signal, wherein the desired signal has a conjugate symmetric property; and
    determining at least one correlation value based on the initial hypothesis, wherein the at least one correlation value indicates the extent to which at least one sample sequence selected from the received signal has the conjugate symmetric property and is determined using circular convolution.

2. The method of claim 1, wherein the wireless device is part of a wireless communication system that utilizes orthogonal frequency division multiplexing, and wherein the desired signal comprises a preamble signal.

3. The method of claim 1, wherein the at least one correlation value is determined in at least one of a frequency domain and a time domain.

4. The method of claim 1, wherein the initial hypothesis is determined using a coarse detection method.

5. The method of claim 1, further comprising setting samples $y(n_0+1)$ and $$y\left(\frac{n_0+N}{2}+1\right)$$

equal to zero, wherein $y(\ )$ represents the received signal, $n_0$ represents a hypothesis for the starting position of the desired signal within the received signal and $N$ represents number of samples of the received signal that are under consideration.

6. The method of claim 1, further comprising:
    generating a threshold value; and
    comparing the at least one correlation value with the threshold value.

7. A wireless device, comprising:
    a coarse detector that is configured to determine an initial hypothesis for a starting position of a desired signal within a received signal, wherein the desired signal has a conjugate symmetric property; and
    a correlator that is configured to determine at least one correlation value based on the initial hypothesis, wherein the at least one correlation value indicates the extent to which at least one sample sequence selected from the received signal has the conjugate symmetric property and is determined using circular convolution.

8. The wireless device of claim 7, wherein the wireless device is part of a wireless communication system that utilizes orthogonal frequency division multiplexing, and wherein the desired signal comprises a preamble signal.

9. The wireless device of claim 7, wherein the at least one correlation value is determined in at least one of a frequency domain and a time domain.

10. The wireless device of claim 7, wherein the correlator is also configured to set samples $y(n_0+1)$ and $$y\left(\frac{n_0+N}{2}+1\right)$$

equal to zero, wherein $y(\ )$ represents the received signal, $n_0$ represents a hypothesis for the starting position of the desired signal within the received signal and $N$ represents number of samples of the received signal that are under consideration.

11. The wireless device of claim 7, further comprising:
    a threshold generator that is configured to generate a threshold value; and
    a detector that is configured to compare the at least one correlation value with the threshold value.

12. The wireless device of claim 7, wherein the wireless device is at least part of a mobile handset.

13. The wireless device of claim 7, wherein the wireless device is at least part of a base station.

14. An apparatus, comprising:
    means for determining an initial hypothesis for a starting position of a desired signal within a received signal, wherein the desired signal has a conjugate symmetric property; and
    means for determining at least one correlation value based on the initial hypothesis, wherein the at least one correlation value indicates the extent to which at least one sample sequence selected from the received signal has the conjugate symmetric property and is determined using circular convolution.

15. The apparatus of claim 14, wherein the apparatus is part of a wireless communication system that utilizes orthogonal frequency division multiplexing, and wherein the desired signal comprises a preamble signal.

16. The apparatus of claim 14, wherein the at least one correlation value is determined in at least one of a frequency domain and a time domain.

17. The apparatus of claim 14, wherein the initial hypothesis is determined using a coarse detection method.

18. The apparatus of claim 14, further comprising means for setting samples $y(n_0+1)$ and $$y\left(\frac{n_0+N}{2}+1\right)$$

equal to zero, wherein y( ) represents the received signal, $n_0$ represents a hypothesis for the starting position of the desired signal within the received signal and N represents number of samples of the received signal that are under consideration.

19. The apparatus of claim 14, further comprising:
    means for generating a threshold value; and
    means for comparing the at least one correlation value with the threshold value.

20. A computer-program product for performing detection in a wireless communication device, the computer-program product comprising a non-transitory computer readable medium having instructions thereon, the instructions comprising:
    code for determining an initial hypothesis for a starting position of a desired signal within a received signal, wherein the desired signal has a conjugate symmetric property; and
    code for determining at least one correlation value based on the initial hypothesis, wherein the at least one correlation value indicates the extent to which at least one sample sequence selected from the received signal has the conjugate symmetric property and is determined using circular convolution.

21. The computer-program product of claim 20, wherein the wireless device is part of a wireless communication system that utilizes orthogonal frequency division multiplexing, and wherein the desired signal comprises a preamble signal.

22. The computer-program product of claim 20, wherein the at least one correlation value is determined in at least one of a frequency domain and a time domain.

23. The computer-program product of claim 20, wherein the initial hypothesis is determined using a coarse detection method.

24. The computer-program product of claim 20, further comprising code for setting samples $y(n_0+1)$ and $$y\left(\frac{n_0+N}{2}+1\right)$$

equal to zero, wherein y( ) represents the received signal, $n_0$ represents a hypothesis for the starting position of the desired signal within the received signal and N represents number of samples of the received signal that are under consideration.

25. The computer-program product of claim 20, further comprising:
    code for generating a threshold value; and
    code for comparing the at least one correlation value with the threshold value.

* * * * *